United States Patent
So et al.

(10) Patent No.: US 8,611,951 B2
(45) Date of Patent: Dec. 17, 2013

(54) FIXED MOBILE CONVERGENCE TERMINAL USING DOWNLOADABLE WIDEBAND VOICE CODEC, METHOD THEREOF AND METHOD OF PROVIDING WIDEBAND VOICE CODEC IN CALL CONTROL SERVER

(75) Inventors: Woon-Seob So, Daejeon-si (KR);
Hyun-Joo Bae, Daejeon-si (KR);
Byung-Sun Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 95 days.

(21) Appl. No.: 12/899,041

(22) Filed: Oct. 6, 2010

(65) Prior Publication Data

US 2011/0151880 A1    Jun. 23, 2011

(30) Foreign Application Priority Data

Dec. 21, 2009 (KR) ......................... 10-2009-0127870

(51) Int. Cl.
*H04M 1/00* (2006.01)
*H04L 12/28* (2006.01)

(52) U.S. Cl.
USPC ................. 455/552.1; 455/550.1; 455/557; 370/395.5

(58) Field of Classification Search
USPC .......... 455/72, 168.1, 169.1, 177.1, 221, 224, 455/403.1, 404.1, 418–420, 445, 459, 517, 455/550.1, 552.1, 553.1, 556.1–556.2, 455/557–558, 560–561; 379/9.01, 93.29, 379/93.32–93.33, 142.13–142.14, 379/242–243; 709/220–221, 227–228, 247; 717/168–178; 370/328, 338, 386, 370/486–487, 545, 395.5
See application file for complete search history.

(56) References Cited

U.S. PATENT DOCUMENTS

| | | | |
|---|---|---|---|
| 6,332,119 B1 | 12/2001 | Hinderks | |
| 6,353,666 B1 * | 3/2002 | Henderson et al. | 379/229 |
| 7,526,450 B2 | 4/2009 | Hughes et al. | |
| 7,573,848 B2 | 8/2009 | Choi | |
| 7,770,200 B2 * | 8/2010 | Brooks et al. | 725/95 |
| 7,808,988 B2 * | 10/2010 | Neff | 370/389 |
| 2006/0218482 A1 * | 9/2006 | Ralston et al. | 715/500.1 |
| 2007/0204311 A1 * | 8/2007 | Hasek et al. | 725/91 |
| 2007/0217436 A1 * | 9/2007 | Markley et al. | 370/401 |
| 2007/0258481 A1 | 11/2007 | Ko et al. | |
| 2008/0109852 A1 * | 5/2008 | Kretz et al. | 725/62 |
| 2009/0083279 A1 * | 3/2009 | Hasek | 707/10 |

FOREIGN PATENT DOCUMENTS

| | | |
|---|---|---|
| KR | 1020060107120 | 10/2006 |
| KR | 1020060129696 | 12/2006 |
| KR | 1020070058041 | 6/2007 |
| KR | 10-0755714 | 9/2007 |
| KR | 10-2008-0045650 | 5/2008 |
| KR | 10-0872076 | 12/2008 |
| KR | 1020090033964 | 4/2009 |
| KR | 1020090128195 | 12/2009 |

\* cited by examiner

*Primary Examiner* — Meless Zewdu
(74) *Attorney, Agent, or Firm* — Nelson Mullins Riley & Scarborough LLP; Anthony A. Laurentano, Esq.

(57) ABSTRACT

A fixed mobile convergence terminal using a wideband voice codec is provided. The fixed mobile convergence terminal includes a communication unit configured to connect to a network, and a control unit configured to download a wideband voice codec identical to a wideband voice codec of an opposite party terminal from a call control server in a call setting with the opposite party terminal through the communication unit, so that a high-quality voice call function is achieved.

11 Claims, 5 Drawing Sheets

FIG. 4

| | | |
|---|---|---|
| Bit 1 | Bit 4 | Bit 8 |
| TYPE OF PROCESSOR CORE | ARCHITECTURE OF PROCESSOR | |
| CLOCK RATE | TYPE OF OPERATING SYSTEM | |
| CODEC NAME | | |
| SAMPLING CLOCK | FRAME LENGTH | |

FIXED MOBILE CONVERGENCE TERMINAL USING DOWNLOADABLE WIDEBAND VOICE CODEC, METHOD THEREOF AND METHOD OF PROVIDING WIDEBAND VOICE CODEC IN CALL CONTROL SERVER

CROSS-REFERENCE TO RELATED APPLICATION

This application claims the benefit under 35 U.S.C. §119 (a) of Korean Patent Application No. 10-2009-0127870, filed on Dec. 21, 2009, the disclosure of which is incorporated by reference in its entirety for all purposes.

BACKGROUND

1. Field

The following description relates to a terminal for a voice communication, and more particularly, to a terminal capable of providing a fixed mobile convergence service using a wideband voice codec.

2. Description of the Related Art

Fixed mobile convergence terminals using a wideband voice codec currently exist. The wideband voice codec is capable of processing a voice signal at a sampling rate of 16 kHz in a hardware scheme, and as such a high quality of voice communication is achieved. However, to this end, both terminals that are involved in the communication need to have the same wideband voice codec. That is, if the terminals each have own different wideband voice codecs, a high quality voice communication can not be provided. For example, if one terminal uses AMR-WB voice codec for a mobile communication network and an opposite party terminal uses G.722 wideband voice codec for a wireless LAN, the voice signal needs to be transcoded to be suitable for one of the codecs of two terminals.

SUMMARY

In one aspect, there is provided a fixed mobile convergence terminal and method thereof capable of using a wideband voice codec identical to that of an opposite party terminal.

In one general aspect, there is provided a fixed mobile convergence terminal using a wideband voice codec. The fixed mobile convergence terminal includes a communication unit and a control unit. The communication unit is configured to connect to a network. The control unit is configured to download a wideband voice codec identical to a wideband voice codec of an opposite party terminal from a call control server in a call setting with the opposite party terminal through the communication unit.

In another general aspect, there is provided a method of downloading a wideband voice codec of a fixed mobile convergence terminal. The method includes identifying a wideband voice codec of an opposite party terminal in a call setting with the opposite party terminal and downloading the identified wideband voice codec from a call control server.

In another general aspect, there is provided a method of providing a wideband voice codec of a call control server. The method includes registering a profile of a fixed mobile convergence terminal, identifying a profile of the fixed mobile convergence terminal if a request for a wideband voice codec identical to a wideband voice codec of an opposite party terminal is issued from the fixed mobile convergence terminal in a call setting with the opposite party terminal, and sending the fixed mobile convergence terminal a wideband voice codec which is identical to the wideband voice codec of the opposite party terminal and suitable for the identified profile.

As described above, the fixed mobile convergence terminal connects an internet network through various wireless communication schemes, if necessary, downloads a wideband voice codec from a call control server, and provides functions such as a high-quality voice call and a multimedia internet connection. The fixed mobile convergence terminal handled various functions according to a user's preference through a changing and an adding of functions in a simple manner. As one example, the installation of an IPTV program allows the fixed mobile convergence terminal to be used as an IPTV terminal, the adding of a Digital Multimedia Broadcasting (DMB) receiving element allows the fixed mobile convergence terminal to be used as a DMB receiving terminal, the adding of Global Positioning System (GPS) receiving element allows the fixed mobile convergence terminal to be used as a navigation terminal, and the addition of a Long Term Evolution (LTE) element allows the fixed mobile convergence terminal to be used as a wireless terminal for 4G.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 4 is a view showing a configuration of one example of a profile data which is registered in a call control server by the fixed mobile convergence terminal shown in FIG. 1.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
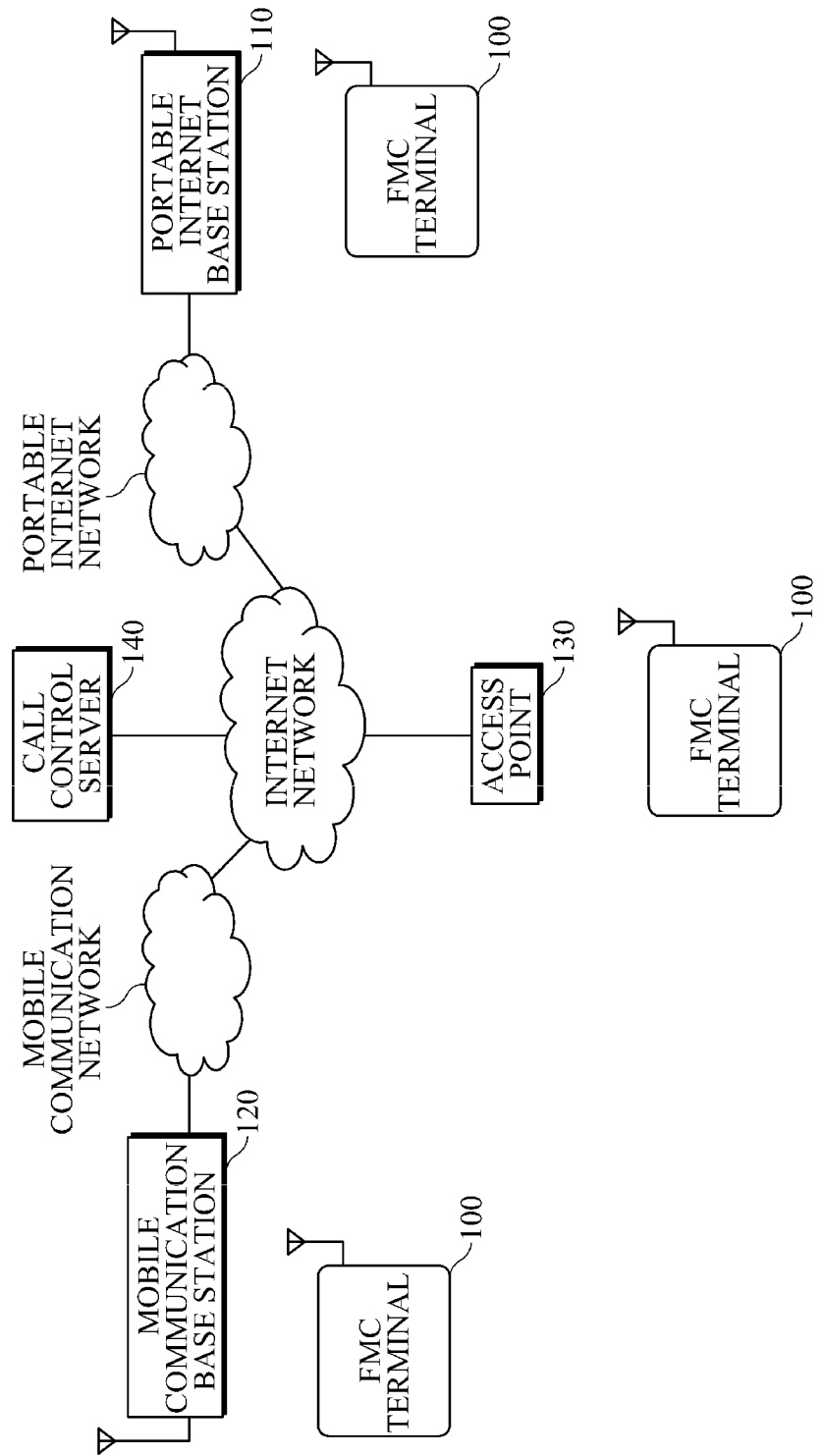
FIG. 1 is a view showing one example of a network connection of a fixed mobile convergence terminal using a downloadable wideband voice codec.

FIG. 1 is a view showing one example of a network connection of a fixed mobile convergence terminal using a downloadable wideband voice codec.

A fixed mobile convergence terminal 100 is connected to an internet network through different networks. In order to establish a connection to a portable internet network, the fixed mobile convergence terminal 100 is connected to a base station for a portable internet system, such as a Radio Access Station (RAS) 110. In order to establish a connection to a mobile communication network, the fixed mobile convergence terminal 100 is connected to a base station for a mobile communication system, such as a Radio Network Controller (RNC) or a Base Transceiver Station (BTS) 120. In order to establish a connection to a wireless LAN, the fixed mobile convergence terminal 100 is connected to an Access Point (AP) 130. That is, the fixed mobile convergence terminal 100 connects to the access point 130, the RAS 110 or the RNC 120, thereby performing a high-quality voice call function and a multimedia internet access service function through a wideband voice codec. According to one example, the fixed mobile convergence terminal 100 connects to a call control server 140 to download a proper wideband voice codec for a current situation from the call control server 140. Details of the downloading of the wideband voice codec will be described later.

Figure 2:
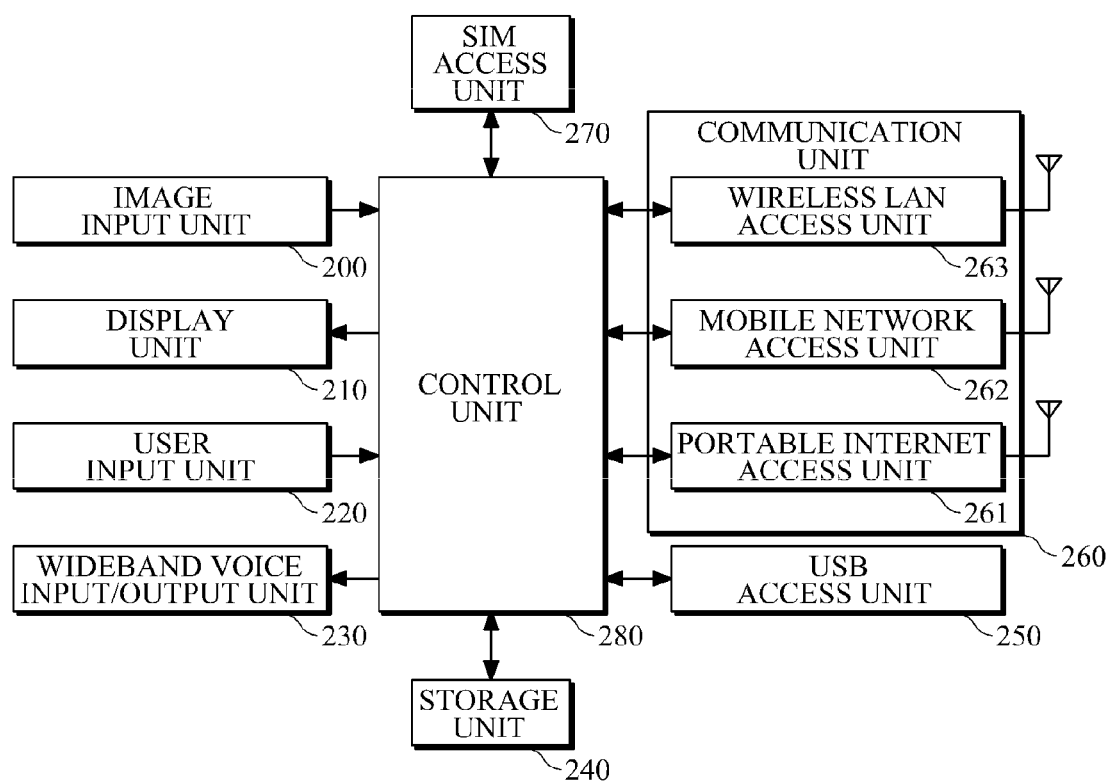
FIG. 2 is a block diagram showing one example of a fixed mobile convergence terminal using a downloadable wideband voice codec.

FIG. 2 is a block diagram showing one example of a fixed mobile convergence terminal using a downloadable wideband voice codec.

An image input unit 200 may be a camera module which picks up images by use of a Complimentary Metal Oxide Semiconductor (CMOS) image sensor or a Charge Coupled Device (CCD) image sensor, and may include a plurality of camera lens having different resolutions. The image input unit 200 is connected to a control unit 280 through an 8 bit camera data signal (CD0 to CD7), a camera data clock signal (CCLK), a camera data strobe signal (STRB), a camera data vertical synchronizing signal (VSYNC), a camera data horizontal synchronizing signal (HSYNC), a serial control data signal (SDAT), and a serial control data clock signal (SLCK).

A display unit 210 may be a Color Liquid Crystal Display (CLCD) module. The CLCD module is connected to the control unit 280 through an up-to-24 bit CLCD data is signal (LD0 to LD23), a CLCD data clock signal (LCLK), a CLCD data enable signal (LDE), a CLCD vertical synchronizing signal (LVSYNC), and a CLCD horizontal synchronization signal (LHSYNC). Such a display unit 210 displays each status of the fixed mobile convergence terminal, and a message and an image data needed by a user. A user input unit 220 may include a keypad and a touch screen. The keypad includes 13 primary key buttons for dialing phone numbers and specific numbers and 16 function-key buttons for a supplementary service. The function-key button includes a menu key, an enter key, a send key, an end key, a setting key and a speaker volume key, etc. The touch screen is implemented on the CLCD module to enable an input of a user d through the touch screen.

A wideband voice input/output unit 230 includes a wideband headset, a microphone and a speaker for processing a wide frequency range (50 Hz to 7000 Hz) of voice signal to achieve a high-quality reception/transmission function of voice and audio signals. A storage unit 240 may include a NOR flash ROM allowing an access through a 8 bit/16 bit/32 bit bus, a NAND flash ROM allowing an access through an 8 bit bus, or a DDR2 (Double Data Rate 2) SDRAM (Synchronous Dynamic Random Access Memory) allowing an access through a 16 bit/32 bit bus.

A Universal Serial BUS (USB) access unit 250 uses a USB On The Go (OTG) transceiver which is implemented by use of an On The Go (OTG) port having a function varying depending on a device connected thereto. The USB access unit 250 is connected to the control unit 280 through input data signals (OVM and OVP), output data signals (OVMO and OVPO), a data enable signal (DE), an interrupt signal (INT), a serial data clock signal (SCL), and a serial data signal (SDA). The USB access unit 250 is connected to the USB OTG port through a differential plus data signal (ODP) and a differential minus data signal (ODM) to transmit and receive data. Modes of the USB access unit 250, such as a host mode and a device mode, are determined according to the ID pin level of the USB port.

The communication unit 260 is configured to connect to a network. The communication unit 260 includes a portable internet access unit 261, a mobile network access unit 262 and a wireless LAN access unit 263. The portable internet access unit 261 is connected to the control unit 280 through address signals (A10 to A0), data signals (D15 to D0), chip enable signals (CE1 to CE0), an output enable signal (OE), a write enable signal (WE), a ready signal (RDY), 16 bit input/output signals (IOCS 16), a reset signal (RST), an input/output device channel ready signal (IOCHRDY), a diagnosis completion signal (DIAG), an active signal (ACT), an input/output device read signal (IORD), an input/output device write signal (IOWR), voltage sense signals (VS2 and VS1), and card detection signals (CD2 and CD1), thereby performing data processing for wireless transfer through a portable internet system, for example, WiBro/WiMAX.

The mobile network access unit 262 is connected to the control unit 280 through a secure digital input output data signal (SDDAT3 to SDDAT0), a secure digital input output command signal (SDCMD), a secure digital input output clock signal (SDCLK), a secure digital input output clock signal (SDCLK), and a secure digital input output write protection signal (SDWP), thereby performing data processing for wireless transfer through a mobile communication system, for example, WCDMA (Wideband Code Division Multiple Access)/HSDPA (High-Speed Downlink Packet Access), HSUPA (High-Speed Uplink Packet Access), LTE (Long Term Evolution) and UWB (Ultra-Wideband). The wireless LAN access unit 263 is connected to the control unit 280 through an input data signal (UOVM and UOVP), output data signals (UOVMO and UOVPO), a data enable signal (UDE), an interrupt signal (UINT), a serial data clock signal (USCL), and a serial data signal (USDA), thereby performing data processing for wireless transfer through a wireless LAN (802.11 a/b/g/n). A subscriber identity module (SIM) access unit 270 performs data transmission/reception with a subscriber identity module through a SIM reset signal (SIMRST), a SIM data clock signal (SIMCLK), a SIM data signal (SIMDAT), and a SIM card detection signal (SIMD). The control unit 280 is a processor that is equipped with a processor core and is connected to the above components such that the protocol processing and the operation of the terminal are performed differently in terms of hardware and software depending on the communication scheme of the respective components.

Figure 3:
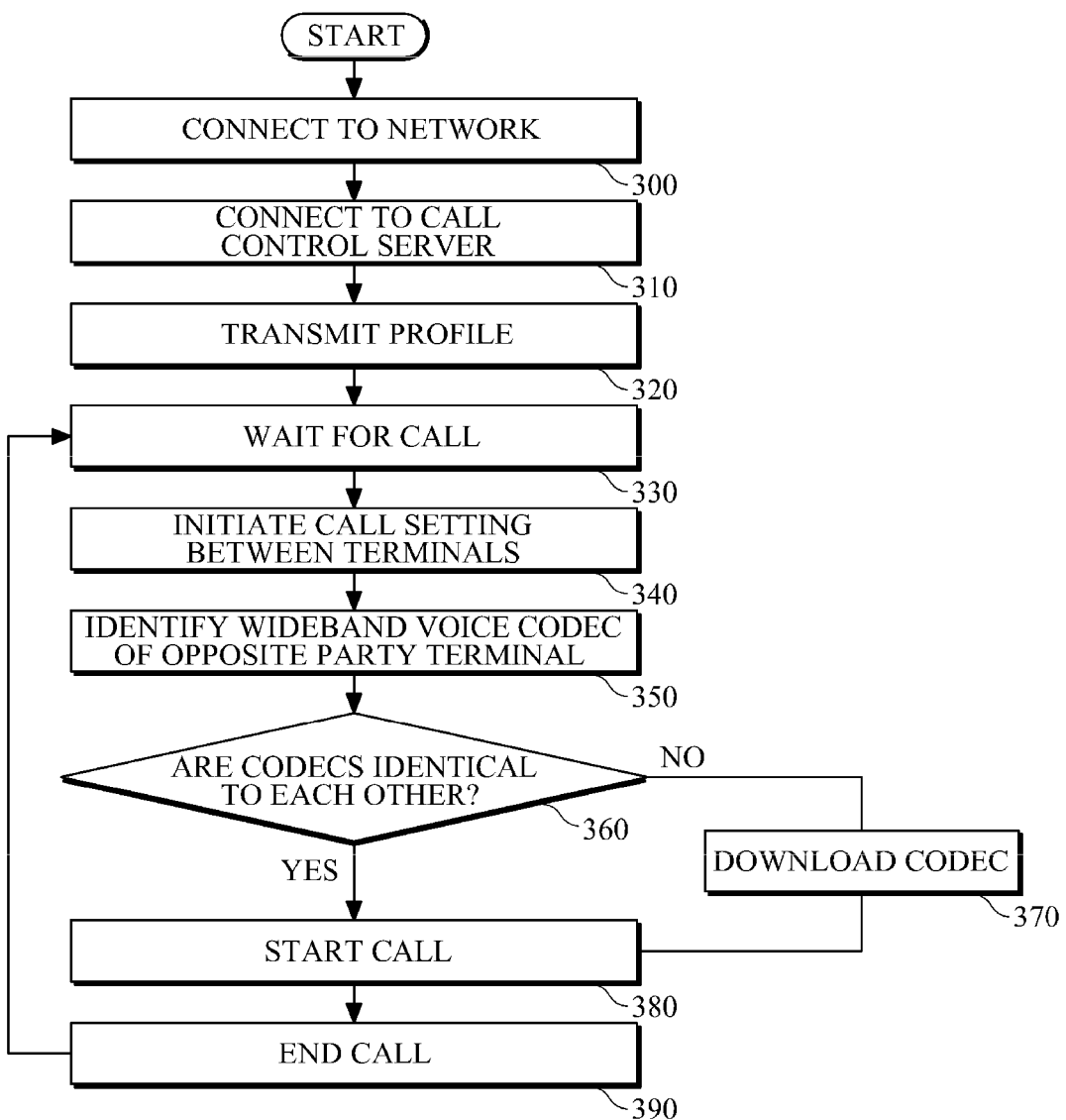
FIG. 3 is a flow chart of one example of a fixed mobile convergence terminal using a downloadable wideband voice codec.

FIG. 3 is a flow chart of one example of an operation of a fixed mobile convergence terminal using a downloadable wideband voice codec.

The fixed mobile convergence terminal 100 searches for the most suitable network among a mobile communication network, a portable internet network and a wireless LAN (300), and connects to the network. After the connection to the network, the fixed mobile convergence terminal 100 connects to the call control server 140 and sends the call control server 140 a profile indicating its state and capability (310 and 320). The call control server 140 stores and manages the profile transmitted from the fixed mobile convergence terminal 100. After that, the fixed mobile convergence terminal 100 maintains a call waiting state (330).

In the call waiting state, if a user attempts a voice call, the fixed mobile convergence terminal 100 starts a call setting with an opposite party terminal (340). In a session initiation protocol (SIP) process for the call setting, the fixed mobile convergence terminal 100 checks if a wideband voice codec of the opposite party terminal is identical to its own wideband voice codec (350 and 360). If the fixed mobile convergence terminal 100 has a wideband voice codec different from that of the opposite party terminal, the fixed mobile convergence terminal 100 downloads a wideband voice codec identical to the opposite party terminal from the call control server 140 (370). The call control server 140 identifies a profile of the fixed mobile convergence terminal 100 and sends the fixed mobile convergence terminal 100 a wideband voice codec suitable for the profile. After that the fixed mobile convergence terminal 100 initiates a call and terminates the call according to a is call end command (380 and 390).

Meanwhile, when a subscriber connected to a wireless LAN or a portable internet network attempts to communicate with a subscriber connected to a mobile communication network by use of an internet telephone 150, such as Skype, if the fixed mobile convergence terminal 100 does not have a wideband voice codec used by Skype, for example, SILK, the fixed mobile convergence terminal 100 may download SILK codec or AMR-WB codec suitable for its own profile from the call control server 140. In this manner, a high quality call service is ensured. Similarly, when the fixed mobile convergence terminal 100 attempts to communicate with a terminal connected to a Public Switched Telephone Network (PSTN), one of two terminals involved with the communication matches the wideband voice codec to the other terminal by downloading a wideband voice codec suitable for its own profile, so that a high-quality voice call is achieved.

FIG. 4 is a view showing a configuration of one example of a profile data which is registered in a call control server by the fixed mobile convergence terminal shown in FIG. 1.

The processor core for processing a wideband voice codec may be ARM, MIPS, PPC, M68, TIDSP, TEAK, OAK, etc. The architecture of the processor corresponding to the architecture of the processor core, for example, ARM7, ARM9, ARM9E, ARM11, CORTEX, M26K, M24K, etc. The clock rate of the processor corresponds to the clock rate of a processor core ranging from 100 MHz to 1 Gz. The operating system of the processor may be Symbian, Window Mobile, OS2, Linux and Android. The codec of the processor may be AMR-WB, G.722, G.711.1, G.729.1, Speex, SILK, etc. The sampling clock of the processor is 8 kHz, 16 kHz, 24 kHz, 32 kHz, etc. The sampling clock of 8 kHz is suitable for a narrow band, the sampling clock of 16 kHz is suitable for a wideband and the above range of sampling clock is suitable for a super wideband. The frame length of the processor is the frame length of a code needed to be processed in a jitter buffer, and the frame length available for use is 5 ms, 10 ms, 15 ms and 20 ms. The fixed mobile convergence terminal 100 downloads a proper codec for the type and capability of its own processor based on the profile shown in FIG. 4, to normally operate. In this regard, the call control server 140 has all kinds of codecs each optimized for respective processors.

Figure 5:
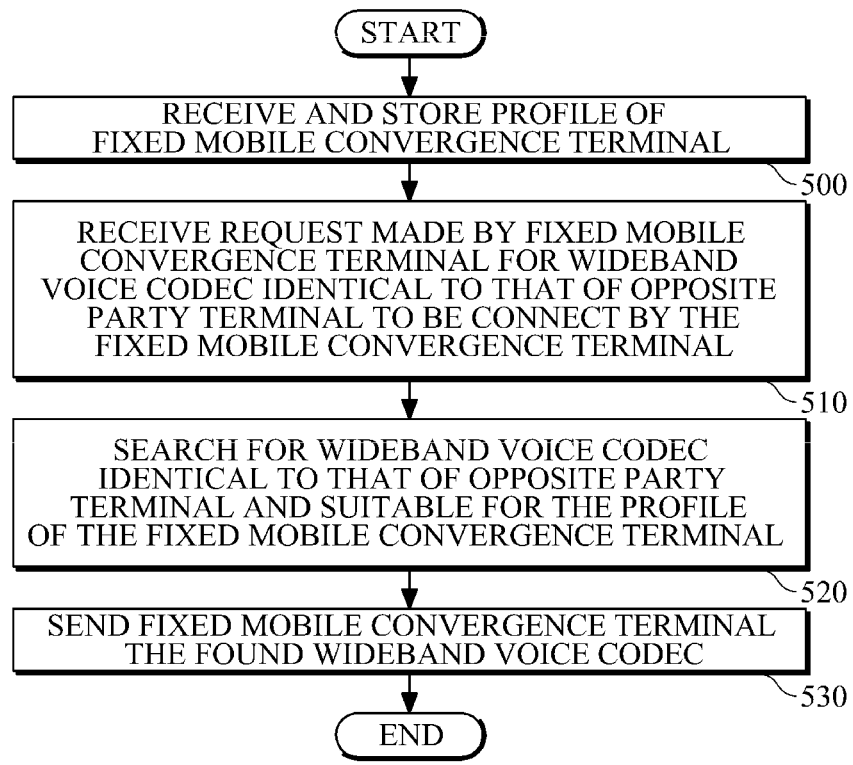
FIG. 5 is a flow chart of one example of an operation of a call control server.

FIG. 5 is a flow chart of one example of an operation of a call control server.

The call control server 140 receives a profile of the fixed mobile convergence terminal 100, and stores and manages the received profile (500). After that, the call control server 140 receives a request for a wideband voice codec identical to that of an opposite party terminal from the fixed mobile convergence terminal 100 (510). The opposite party terminal represents a terminal to which the fixed mobile convergence terminal 100 attempts to connect. The call control server 140 identifies the profile of the fixed mobile convergence terminal 100 and searches for a wideband voice codec which is identical to that of the opposite party terminal and suitable for the profile of the fixed mobile convergence terminal 100 (520).

The found wideband voice codec is sent to the fixed mobile convergence terminal 100 (530).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fixed mobile convergence terminal using a wideband voice codec, the fixed mobile convergence terminal comprising:
    a communication unit configured to connect to a network; and
    a control unit configured to download a wideband voice codec identical to a wideband voice codec of an opposite party terminal from a call control server in a call setting with the opposite party terminal through the communication unit,
    wherein the fixed mobile convergence terminal checks whether the wideband voice codec of the opposite party terminal is identical to a wideband voice codec of the fixed mobile convergence terminal in a session initiation protocol (SIP) process for the call setting,
    wherein when the wideband voice codec of the fixed mobile convergence terminal is different than the wideband voice codec of the opposite party terminal, the fixed mobile convergence terminal downloads the wideband voice codec identical to the wideband voice codec of the opposite party terminal from the call control server in the call setting with the opposite party terminal.

2. The fixed mobile convergence terminal of claim 1, wherein the communication unit includes a portable internet access unit for access to a portable internet network, a mobile network access unit for access to a mobile communication network and a wireless local area network (LAN) access unit for access to a wireless local area network (LAN).

3. The fixed mobile convergence terminal of claim 1, wherein the control unit registers a profile of the fixed mobile convergence terminal in the call control server.

4. The fixed mobile convergence terminal of claim 3, wherein the profile includes at least one of a type of a processor core, a structure of a processor, a clock rate, a type of an operating system, a name of a codec, a sampling clock, and a frame length to be processed in a jitter buffer.

5. The fixed mobile convergence terminal of claim 4, wherein the downloaded wideband voice codec is suitable for the profile.

6. A method of downloading a wideband voice codec of a fixed mobile convergence terminal, the method comprising:
    identifying a wideband voice codec of an opposite party terminal in a call setting with the opposite party terminal; and
    downloading the identified wideband voice codec from a call control server,
    wherein the fixed mobile convergence terminal checks whether the wideband voice codec of the opposite party terminal is identical to a wideband voice codec of the fixed mobile convergence terminal in a session initiation protocol (SIP) process for the call setting,
    wherein when the wideband voice codec of the fixed mobile convergence terminal is different than the wideband voice codec of the opposite party terminal, the fixed mobile convergence terminal downloads a wideband voice codec identical to the wideband voice codec of the opposite party terminal from the call control server in the call setting with the opposite party terminal.

7. The method of 6, further comprising sending the call control server a profile of the fixed mobile convergence terminal before the call setting with the opposite party terminal.

8. The method of claim 7, wherein the profile includes at least one of a type of a processor core, a structure of a processor, a clock rate, a type of an operating system, a name of a codec, a sampling clock, and a frame length to be processed in a jitter buffer.

9. The method of claim 7, wherein, in the downloading, a wideband voice codec suitable for the profile is downloaded from the call control server.

10. A method of providing a wideband voice codec in a call control server, the method comprising:

registering a profile of a fixed mobile convergence terminal;

when a request for a wideband voice codec identical to a wideband voice codec of an opposite party terminal is issued from the fixed mobile convergence terminal in a call setting with the opposite party terminal, identifying a profile of the fixed mobile convergence terminal; and sending the fixed mobile convergence terminal a wideband voice codec which is identical to the wideband voice codec of the opposite party terminal and suitable for the identified profile, wherein the fixed mobile convergence terminal checks whether the wideband voice codec of the opposite party terminal is identical to the wideband voice codec of the fixed mobile convergence terminal in a session initiation protocol (SIP) process for the call setting, wherein when the wideband voice codec of the fixed mobile convergence terminal is different than the wideband voice codec of the opposite party terminal, the fixed mobile convergence terminal downloads a wideband voice codec identical to the wideband voice codec of the opposite party terminal from the call control server in the call setting with the opposite party terminal.

11. The method of claim 10, wherein the profile includes at least one of a type of a processor core, a structure of a processor, a clock rate, a type of an operating system, a name of a codec, a sampling clock, and a frame length to be processed in a jitter buffer.

* * * * *